Patented July 8, 1941

2,248,512

UNITED STATES PATENT OFFICE 2,248,512

DEPOLYMERIZATION OF POLYSTYRENE

Thomas Bruce Philip, Effingham, Herbert Muggleton Stanley, Tadworth, and William Laurence Wood, Tunbridge Wells, England, assignors to The Distillers Company Limited, Edinburgh, Scotland, a British company No Drawing. Application February 7, 1940, Serial No. 317,772. In Great Britain February 16, 1939

16 Claims. (Cl. 260—669)

This invention relates to the de-polymerization of polystyrenes. It is known that polystyrene can be de-polymerized by heat to give a product consisting mainly of monomeric styrene together with some ethyl benzene and other hydrocarbons. Hitherto the thermal depolymerization of polystyrene by simple heating of a stagnant mass has resulted in considerable loss by decomposition and coke formation owing to the high viscosity and low heat conductivity of the polystyrene and consequent local overheating and the considerable quantity of heat required to effect de-polymerization.

According to the present invention the thermal depolymerization of polystyrene consists in subjecting the polystyrene either pure or in the crude form to a depolymerizing treatment by rapid heating of short duration the speed of which is ensured by intimately contacting the polystyrene with the body or surface of a heated material of high heat conductivity maintained at a temperature of 550° C. to 700° C. whilst preventing a static or sluggish state of contact.

For optimum results the intimate contact of the polystyrene resin with the heating medium or surface may be done by vigorously agitating molten heat transfer material and continuously feeding molten polystyrene on to the agitated surface. Alternatively the molten resin may be introduced continuously in a finely divided form into the molten heat transfer material so that heat transfer is rapid.

A highly satisfactory source of heat is a mass of molten material of high heat conductivity such as molten metal, e. g. lead, or a molten alloy or fused metallic salt or mixture of salts, as its temperature can be well maintained, and good rapid contact of the polymerized body therewith can be ensured by agitation or intermingling. Alternatively a solid heating surface such as a hot plate or wall of high heat conductivity may be employed, especially if used in conjunction with some form of violent disturbance, as produced for example by co-operating scrapers or paddles or by rotating the plate itself.

The material to be depolymerized is advantageously fed to the heating zone in a fluid state as by being preheated to a molten condition with or without the aid of a solvent. For example a stream of the resinous material just previously rendered molten may be fed continuously onto the surface of a bulk of molten metal kept in agitation as by stirring, or the stream may be introduced in a finely divided condition into the bulk of molten metal and thereby cause adequate agitation, or the molten resin may be atomised with steam or an inert diluent and passed through a heated reaction zone, as for example, a tube provided with metallic fins or baffle plates. In all cases the inter-contact is rapid and efficient and the desired depolymerized product quickly leaves the heating zone by vaporization. If desired a medium, e. g. steam, may be used to aid in conveying or sweeping away the depolymerized product from the heating zone.

Irrespective of the mode of contact of the molten polystyrene with the heating medium, it is of the utmost importance that the temperature of the heating medium should be sufficiently high, preferably about 650° C. to promote depolymerization at a rapid rate so that the time of heating of the molten material is reduced to a minimum since prolonged heating of polystyrene at considerably lower temperatures gives rise to low yields of monostyrene and high yields of high-boiling oils. The introduction of the polystyrene into the heating zone as a continuous stream in the molten condition may be effected by means of suitably heated pumps or through heated valves. To reduce the viscosity of the molten resinous material, solvents may be added to said material prior to or after melting. For this purpose the high-boiling oils produced as by-products of the depolymerization process have proved very satisfactory; however, other solvents for polystyrene may be used.

The depolymerizing treatment may be carried out either at atmospheric pressure or at pressures other than atmospheric, particularly increased pressures of the order of a few atmospheres.

In order that the invention may be clearly understood and readily carried into effect we will now describe the same more fully with reference to the following examples of procedure carried out in a simple form of apparatus which we will first describe.

The apparatus was a cylindrical vessel five inches in internal diameter and fourteen inches deep fitted with a flanged cover having a charging hole and carrying a thermometer pocket, a steam inlet pipe, a vapour outlet pipe, a pressure gauge, and a safety valve. A stirring shaft with two paddles was mounted in a step bearing at the base of the vessel, and in a guide bearing with gland in the cover. The shaft was driven by an electric motor through a worm reduction gear at a speed of 120 to 130 revolutions per minute. The bottom edges of the paddles were serrated, and located to give a clearance of one-quarter of an inch from the base of the vessel. Heat was applied externally to the vessel by means of gas firing, and temperatures were measured by a thermo-couple placed in the thermometer pocket of the cover and a second thermo-couple welded on to the outer surface of the base of the vessel to indicate skin temperatures.

*Example 1*

A solution of 500 grams of pure polystyrene (of molecular weight about 60,000, as determined by the Staudinger viscosity method) in 630 grams of benzene was run slowly into the heated depolymerizing vessel which contained in its base a layer one quarter of an inch thick of soft solder agitated by the stirrer rotating at a speed of 120 R. P. M. During the addition of the polystyrene solution, the skin temperature at the base of the vessel was maintained at 615–620° C. (giving an internal temperature of around 350°–400° C.). These conditions result in an almost instant depolymerization of the resin as it was fed into the vessel. The products of the reaction passed as vapour out of the vessel to a condenser and receiver. No steam was used. On fractionating the liquid reaction products, 431 grams of monostyrene and 67 grams of high boiling oils were obtained, representing a depolymerization efficiency of about 86 per cent by weight. No appreciable coke formation could be detected.

*Example 2*

A solution of 500 grams of a crude polystyrene resin (containing approximately 70 per cent of polystyrene admixed or co-polymerized with other polymerized hydrocarbons) in 300 grams of benzene was fed continuously into the depolymerizing vessel under conditions similar to those used in Example 1, except that a somewhat higher skin temperature, namely 650° C. was maintained. The crude reaction products yielded, on careful fractionation and analysis, 292 grams of monostyrene and about 37 grams of α-methylstyrene. The recovery of monostyrene was, therefore, about 58 per cent by weight of the crude resin used. Practically no coke was formed.

*Example 3*

Operating with the same raw material and under conditions similar to those used in Example 2, but including the passing of steam through the reaction vessel at the rate of 1.0 kilogram per hour, the yield of monostyrene was 50 per cent of the resin used. No appreciable coke formation occurred.

*Example 4*

Operating with the same raw materials and under conditions similar to those used in Example 2, but employing no lead alloy in the base of the reaction vessel, the yield of monostyrene was 53 per cent of the resin used. About 2 per cent of coke was also formed.

It has been found that operating under the same conditions but without efficient agitation of the molten material appreciable formation of coke occurs such as 10 per cent or more.

What we claim is:

1. The process of depolymerization of polystyrene which comprises subjecting the polystyrene to a rapid heating of short duration the speed of which is ensured by intimately contacting the polystyrene with the body or surface of a heated material of high heat conductivity maintained at a temperature of from 550° C. to 700° C. whilst preventing a static or sluggish state of contact.

2. The process according to claim 1 in which the material of high heat conductivity is molten metal.

3. The process according to claim 1 in which the material of high heat conductivity is a molten alloy.

4. The process according to claim 1 in which the material of high heat conductivity is fused salt.

5. The process according to claim 1 in which the material of high heat conductivity is a mixture of fused salts.

6. The process according to claim 1 in which the polystyrene is fed gradually onto the agitated surface of a molten heating material.

7. The process according to claim 1 in which the polystyrene is fed gradually and in a liquefied state onto the agitated surface of a molten heating material.

8. The process according to claim 1 in which the polystyrene is fed gradually in finely divided form into a bulk of molten heating material.

9. The process according to claim 1 in which the material of high heat conductivity is a hot solid surface in rapid motion.

10. The process according to claim 1 in which the prevention of a static or sluggish state of contact is ensured by maintaining physical disturbance or agitation of the contacting polystyrene.

11. The process of depolymerization of polystyrene which comprises subjecting the polystyrene to a rapid heating of short duration the speed of which is ensured by intimately contacting the polystyrene with the body or surface of a heated material of high heat conductivity maintained at a temperature of from 550° C. to 700° C. whilst preventing a static or sluggish state of contact and in utilizing a conveying medium to carry the depolymerization product rapidly away from the hot depolymerizing zone.

12. The process of depolymerization of polystyrene which comprises subjecting the polystyrene to a rapid heating of short duration the speed of which is ensured by intimately contacting the polystyrene with the body or surface of a heated material of high heat conductivity maintained at a temperature of from 550° C. to 700° C. whilst preventing a static or sluggish state of contact and in utilizing a conveying medium both to carry the polystyrene to the heating zone and to convey the depolymerization product away therefrom.

13. The process according to claim 1 in which the polystyrene is pre-treated with a solvent thereof serving to reduce its viscosity before the depolymerization treatment.

14. The process according to claim 1, in which the polystyrene is dissolved in a high boiling oily by-product of the depolymerization serving to reduce its viscosity before the depolymerization treatment.

15. The process according to claim 1 carried out at atmospheric pressure.

16. The process according to claim 1 carried out at moderately elevated pressure.

THOMAS BRUCE PHILIP.
HERBERT MUGGLETON STANLEY.
WILLIAM LAURENCE WOOD.